Aug. 18, 1964　　　A. L. LUDWIG　　　3,144,673
WINDSHIELD WIPERS
Filed July 15, 1963
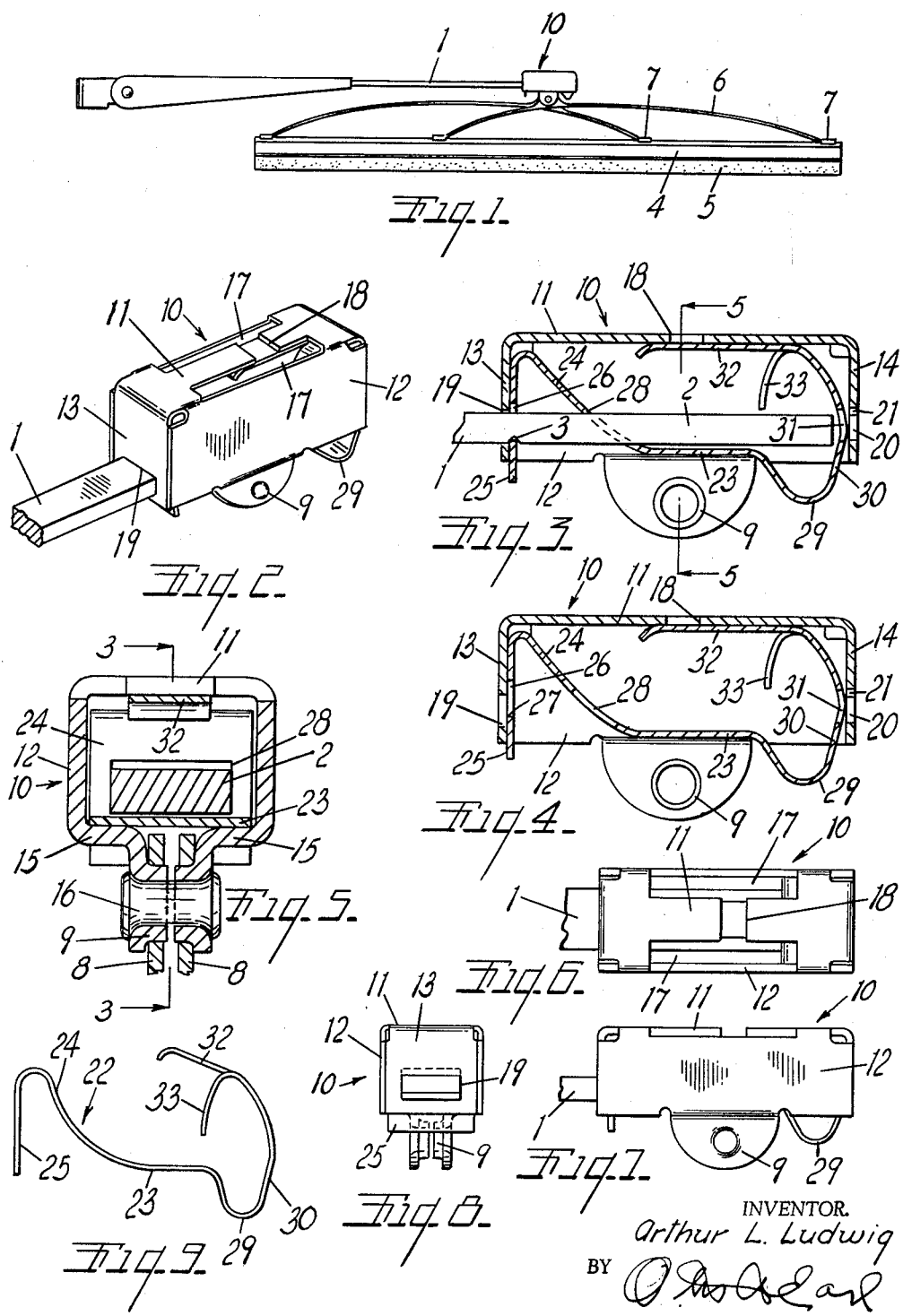
INVENTOR.
Arthur L. Ludwig
BY
ATTORNEY

United States Patent Office 3,144,673
Patented Aug. 18, 1964

3,144,673
WINDSHIELD WIPERS
Arthur L. Ludwig, Hastings, Mich., assignor to Hastings Manufacturing Company, Hastings, Mich.
Filed July 15, 1963, Ser. No. 295,014
8 Claims. (Cl. 15—250.32)

This invention relates to windshield wipers. The main objects of this invention are:

First, to provide a windshield wiper including a coupling member which may be quickly engaged with or disengaged from the actuating arm.

Second, to provide a windshield coupling member adapted to connect the blade unit as a unit to variously designed and positioned actuating arms.

Third, to provide a coupling member for windshield wipers which may be quickly engaged and disengaged and when engaged provides a pivotal connection for the blade unit to the actuating arm.

Fourth, to provide a coupling member having these advantages formed of two parts; a body member which may be formed of sheet metal stock, and a spring member which is retainingly assembled with the body member without the use of fasteners.

Objects relating to details and economies of the invention will appear from the description to follow. The invention is defined and pointed out in the claims. A preferred embodiment of the invention is illustrated in the accompanying drawing, in which:

FIG. 1 is a side elevational view of a windshield wiper embodying my invention, some parts being shown conventionally.

FIG. 2 is a perspective view of the coupling member of my invention, the wiper actuating arm being shown partially broken away.

FIG. 3 is a fragmentary longitudinal section on a line corresponding to line 3—3 of FIG. 5, the actuating arm being shown in full lines.

FIG. 4 is a view corresponding to FIG. 3 illustrating the parts in position occupied thereby with the actuating arm removed.

FIG. 5 is an enlarged transverse section on a line corresponding to line 5—5 of FIG. 3.

FIG. 6 is a fragmentary top view of the structure shown in perspective in FIG. 2.

FIG. 7 is a side elevational view.

FIG. 8 is an end view of the coupling member viewed from the left of FIG. 4.

FIG. 9 is a side or edge view of the latch member removed from the body member.

In the embodiment of my invention illustrated the numeral 1 represents the wiper actuating arm provided with an outer end portion 2 of rectangular cross section and having a notch-like keeper 3 on its underside. The wiper blade unit comprises a body portion 4 and a blade 5. The details of this blade unit form no part of my present invention.

The coacting outwardly bowed springably resilient wiper support members 6 which have blade engaging portions 7 at their outer ends are disposed in crossing relation and provided with outwardly projecting coupling ears 8 disposed in side by side relation to receive the supporting bearings 9 of the coupling member unit designated generally by the numeral 10. This coupling member 10 is formed integrally of bendable stock, desirably sheet metal, and it comprises a top portion 11, side walls 12, and end walls 13 and 14. While these end walls are substantially the same, there is slight variation in the shape of openings therein and in the relation of other parts thereto, therefore two references numerals are used.

The side walls have centrally disposed inwardly projecting bottom portions 15 terminating in the downwardly projecting bearing portions 9 for the coupling members 8 of the wiper. These downwardly projecting coupling members are connected by a rivet or bolt 16.

The top 11 has longitudinal slots 17 therein and a transverse slot 18 providing openings adapted to permit certain types of actuating arms being inserted downwardly therethrough.

The end wall 13 has a slot-like opening 19 adapted to receive the actuating arm 2 when presented endwise thereto.

The end wall 14 has a slot-like opening 20 also adapted to receive an actuating arm, this opening 20 having a notch 21 in its upper edge. The actuating arm is connected to the coupling member by means of the springable latch member designated generally by the numeral 22 which has a base portion 23 supportedly seated on the bottom members 15. This latch member has an upwardly projecting arm 24 terminating in a downwardly projecting portion 25 disposed in slidable, supported engagement with the inner side of the end wall 13. The latch member has an opening 26 therein through which the wiper arm 2 is disposed and the lower edge of the opening 27 forms a latch engaging the notch-like keeper 3 in the arm 2.

The arm 24 of the latch member has an opening 28 therein through which the actuating arm 2 projects. This latch member 22 has a downwardly bowed portion 29 projecting below the coupling member to provide a fingerpiece. The arm 30 of this latch member projects upwardly into sliding engagement with the wall 14 of the coupling member and has an opening 31 alignable with the opening 20 in the body member to receive an actuating member disposed through the opening 20. The upper end 32 of the latch member engages the underside of the top 11 under spring pressure so that spring stress is applied to this latch member to hold its end portions in springable engagement with the end walls of the coupling member and its top portion 32 against the underside of and extending across the transverse opening 18 of the top of the coupling member.

The downwardly projecting portions 33 of the latch member, see FIGS. 3, 4 and 9, result from the deflecting of portions of the outer end of the latch member to form the relatively narrow latch portion 32 which underlies the body member top portion 11.

The springable latch member, of which FIG. 9 is a side view, is under compression stress when it is positioned in the body member as is illustrated. With this arrangement of parts, pressure on the fingerpiece 29 moves both keeper engaging portions to position to receive or to release the wiper arm. In FIGS. 1, 2, 3 and 5 the coupling member is illustrated as mounted on and in retaining engagement with the arm 1 and note the interlocking engagement of the latch member with the notch in the arm 1. In FIGS. 4 and 8 a coupling member is shown with the parts in operative position with the arm removed or before the arm is inserted, and it will be noted that the fingerpiece portion 29 projects downwardly from the body member in all of these figures.

As stated, the embodiment of my invention illustrated is adapted to receive the wiper arm from either end of the body member or certain types of wiper arms may be engaged through the top.

I have not illustrated other embodiments or adaptations of my invention as it is believed that this disclosure will enable those skilled in the art to embody or adapt my invention as may be desired.

Having thus described the invention, what is claimed as new and desired to secure by Letters Patent is:

1. The combination of a windshield wiper blade unit provided with support members having outwardly projecting coupling ears disposed in side by side relation, an actuating arm having a keeper spaced from its inner end, a chambered body member having integral top, side, and end walls, the side walls having centrally disposed inwardly projecting bottom portions terminating in downwardly projecting coupling members disposed in side by side relation and having bearings with which said wiper support member coupling ears are pivotally engaged, the end walls having openings therein adapted to receive said actuating arm, a springably resilient latch member comprising a base portion supportedly seated on the bottom portion of said body member and having an upwardly projecting arm at one end thereof provided with a downwardly projecting latch disposed in supported sliding engagement with the adjacent end wall and having a slot therein through which said actuating arm is disposed, said latch member being springably engageable with said keeper of said actuating arm, said latch member also having a loop-like fingerpiece disposed at the other end of said bottom portion of said body member to project downwardly therefrom and having a second upwardly projecting arm slidably engaged with the other end of said body member and having an opening therein alignable with the arm receiving opening thereof, said upwardly projecting arm having a portion springably engaged with the underside of the top of said body member whereby both of said arms are under actuating arm engaging tension.

2. The combination of a windshield wiper blade unit provided with support members having outwardly projecting coupling ears disposed in side by side relation, an actuating arm having a keeper spaced from its inner end, a chambered body member having integral top, side and end walls, the side walls having centrally disposed inwardly projecting bottom portions terminating in downwardly projecting coupling members disposed in side by side relation and having bearings with which said wiper support member coupling ears are pivotally engaged, one end wall having an opening therein adapted to receive said actuating arm, and a springably resilient latch member comprising a base portion supportedly seated on the bottom portion of said body member and having an upwardly projecting arm at one end thereof having a slot therein through which said actuating arm is disposed, said latch member being springably engageable with said keeper of said actuating arm, said latch member also having a fingerpiece disposed at the other end of said bottom portion of said body member to project downwardly therefrom.

3. A windshield wiper coupling member comprising an integral top, side and end walls, the side walls having inwardly projecting bottom portions provided with blade coupling means, one end wall having an opening therein adapted to receive an actuating arm, and a springably resilient latch member comprising a base portion supportedly seated on the bottom portion of said coupling member and having an upwardly projecting arm provided with a downwardly projecting latch disposed in supported sliding engagement with the adjacent end wall and having a slot therein adapted to receive an actuating arm, said latch member being springably engageable with said keeper of said actuating arm, said latch member having a loop-like fingerpiece disposed at the other end of said bottom portion of said coupling member to project downwardly therefrom and having a second upwardly projecting arm having a portion springably engaged with the underside of the top of said coupling member.

4. A windshield wiper coupling member comprising an integral top, side and end walls, the side walls having inwardly projecting bottom portions, one end wall having an opening therein adapted to receive an actuating arm, and a springably resilient latch member comprising a base portion supportedly seated on the bottom portion of said coupling member and having an upwardly projecting arm provided with a downwardly projecting latch disposed in supported sliding engagement with the adjacent end wall and having a slot therein adapted to receive an actuating arm, said latch member being springably engageable with said keeper of said actuating arm, said latch member having a fingerpiece disposed at the other end of said base portion of said coupling member to project downwardly therefrom and having a second upwardly projecting arm having a portion springably engaged with the underside of the top of said coupling member.

5. A windshield wiper coupling member having substantially parallel side walls and substantially parallel end walls, the end walls having openings therein adapted to receive an attaching arm presented endwise thereto, said side walls having inwardly projecting bottom portions terminating in downwardly projecting wiper coupling members having inwardly projecting wiper support member bearings, and a latch member of flat springably resilient material and including a base portion supportedly seated on the bottom portion of said coupling member and having an upwardly projecting arm at one end terminating in a downwardly projecting portion disposed in slidable supporting engagement with the adjacent end wall and having a slot therein alignable with the slot in the end wall to receive an actuating arm disposed through said end wall, said latch member also having a downwardly curved portion at the other end of said base portion and projecting below the same and constituting a fingerpiece and also having an arm projected upwardly from said fingerpiece portion disposed in sliding engagement with the other end wall and having a slot therein alignable with the arm receiving opening therein and also having a portion thereof springably engaged with the underside of the top portion of the coupling member.

6. A windshield wiper coupling member having substantially parallel side walls and substantially parallel end walls, the end walls having openings therein adapted to receive an attaching arm presented endwise thereto, said side walls having inwardly projecting bottom portions, and a latch member of flat springably resilient material and including a base portion supportedly seated on the bottom portion of said coupling member and having an upwardly projecting arm at one end terminating in a downwardly projecting portion disposed in slidable supporting engagement with the adjacent end wall and having a slot therein alignable with the slot in the end wall to receive an actuating arm disposed through said end wall, said latch member also having a downward portion at the other end of said base portion and projecting below the same and constituting a fingerpiece and also having an arm projected upwardly from said fingerpiece portion disposed in sliding engagement with the other end wall and having a slot therein alignable with the arm receiving opening therein and also having a portion thereof springably engaged with the underside of the top portion of the coupling member.

7. A windshield wiper coupling member comprising top, side and end walls and a bottom having an opening therein, the end walls each having an opening to receive an actuating arm presented endwise thereto, and a latch member of springably resilient material supportedly disposed within said coupling member and having a downwardly offset portion thereof projecting through the bottom opening to constitute a fingerpiece and having arm portions disposed in supported sliding engagement with the inner sides of said end walls adapted to springably engage actuating members disposed endwise through the opening in the adjacent end wall, both of said latch members being simultaneously actuated to arm receiving and disengaging positions by thrust on said fingerpiece.

8. A windshield wiper coupling member comprising top, side and end walls and a bottom having an opening therein, one end wall having an opening to receive an actuating arm presented endwise thereto, and a latch member of springably resilient material supportedly disposed within said coupling member and having a downwardly offset portion thereof projecting through the bottom opening to constitute a fingerpiece and having an arm portion disposed on the inner side of an end wall having an opening therein adapted to springably engage an actuating member disposed endwise through said opening in the end wall.

References Cited in the file of this patent
UNITED STATES PATENTS

| | | |
|---|---|---|
| 2,709,825 | Nesson | June 7, 1955 |
| 2,925,616 | Krohm | Feb. 23, 1960 |
| 3,007,190 | Ryck | Nov. 7, 1961 |
| 3,071,797 | Zury | Jan. 8, 1963 |